Dec. 20, 1938. G. V. RYLSKY 2,140,972
MEANS FOR ILLUMINATING DIALS OF INSTRUMENTS
Filed July 1, 1935 3 Sheets-Sheet 2
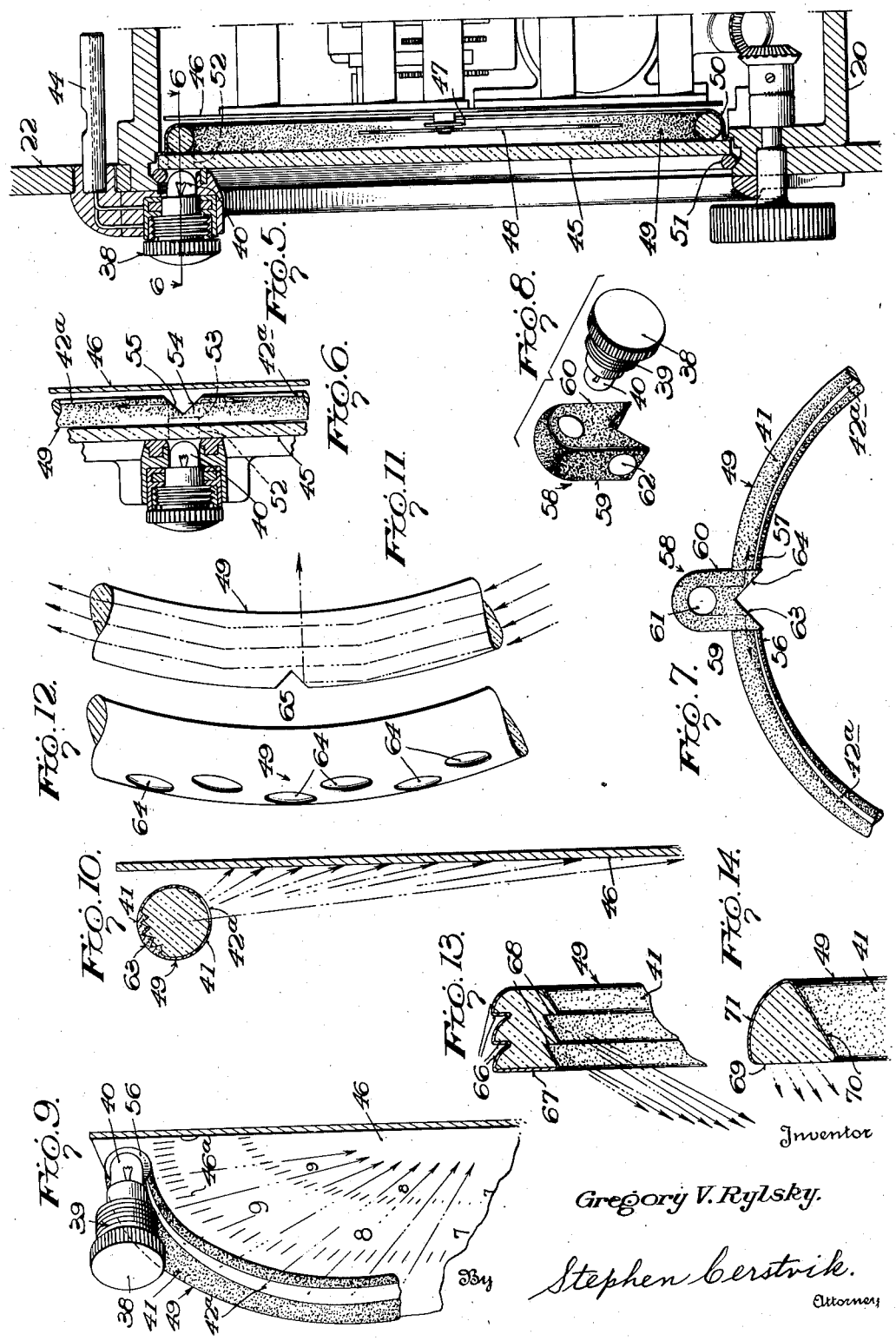
Inventor
Gregory V. Rylsky.
By Stephen Cerstvik.
Attorney Dec. 20, 1938. G. V. RYLSKY 2,140,972
MEANS FOR ILLUMINATING DIALS OF INSTRUMENTS
Filed July 1, 1935 3 Sheets-Sheet 3
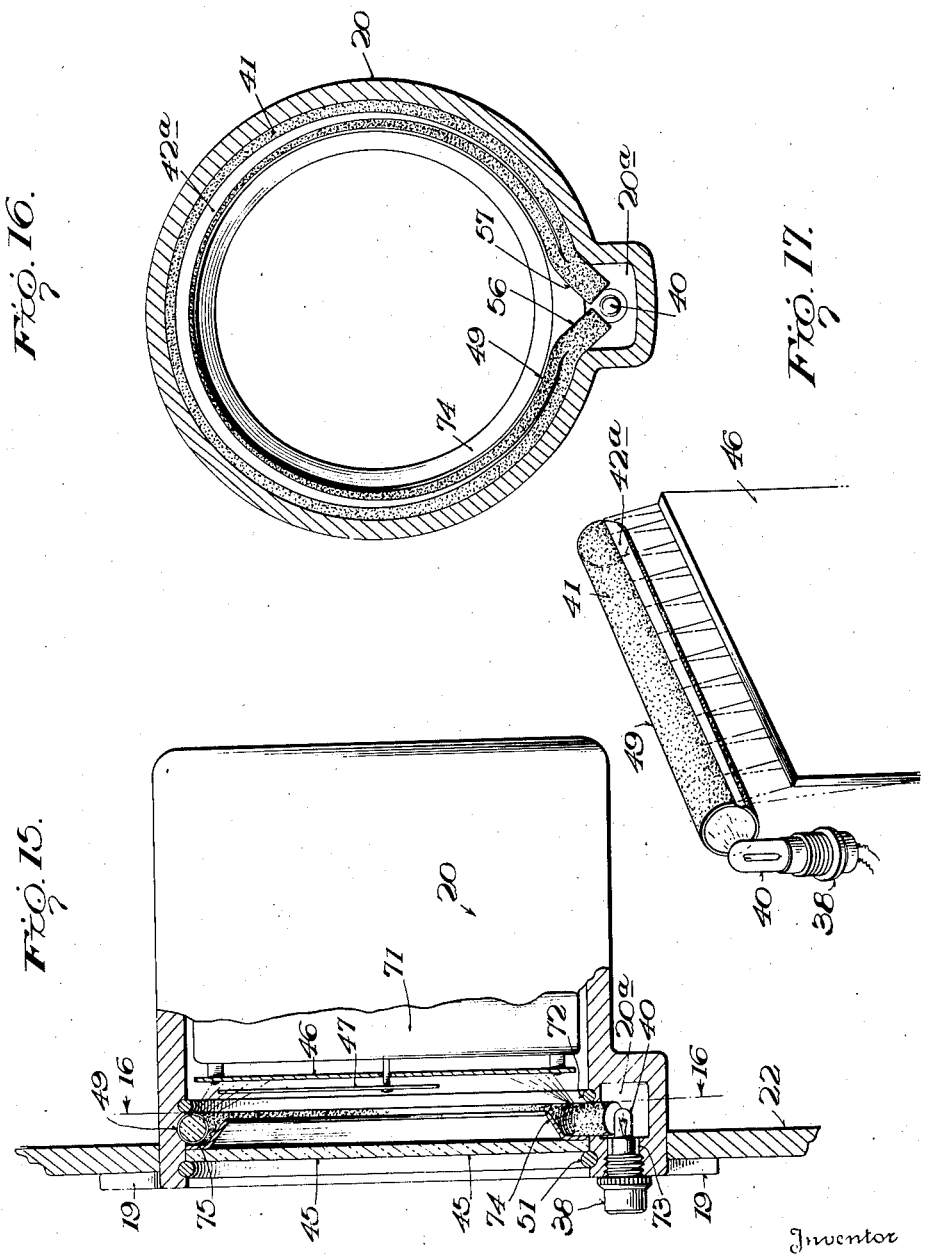
Inventor
Gregory V. Rylsky.
By Stephen Cerstvik.
Attorney Patented Dec. 20, 1938

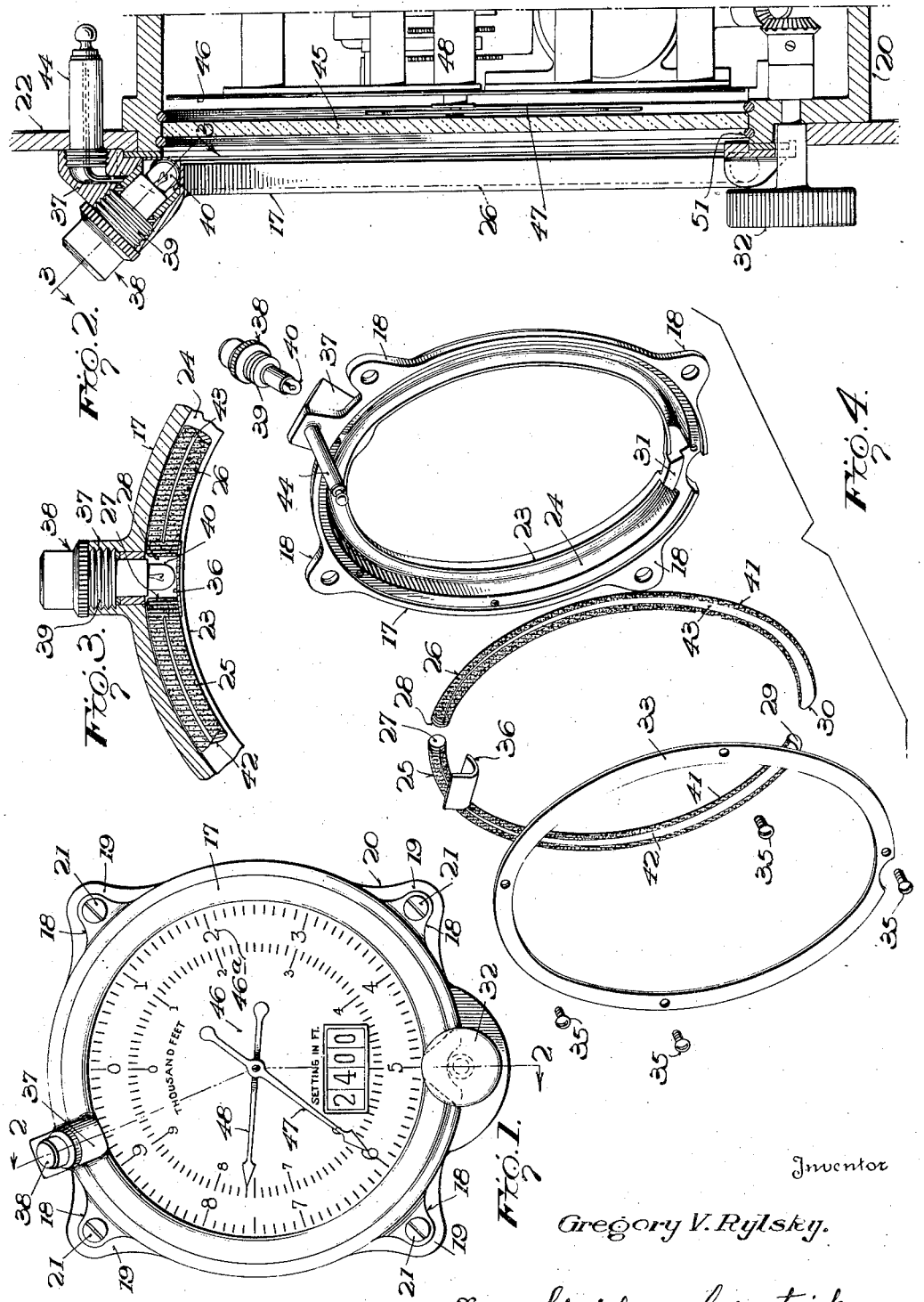

2,140,972

UNITED STATES PATENT OFFICE 2,140,972

MEANS FOR ILLUMINATING DIALS OF INSTRUMENTS

Gregory V. Rylsky, New York, N. Y., assignor to Bendix Aviation Corporation, South Bend, Ind., a corporation of Delaware Application July 1, 1935, Serial No. 29,323

15 Claims. (Cl. 240—2.1)

The present invention relates to indicating instruments and/or indicating devices and more particularly to means for illuminating the indicating means thereof.

One of the objects of the invention is to provide novel means for indirectly illuminating the indicating means of an indicating instrument or other indicating device from a source of light whereby the light is substantially equally distributed to the indicating means without producing a glare.

Another object is to provide, as a new article of manufacture, a device for use in illuminating an indicating dial of an instrument whereby light may be introduced to the dial from a point source and the rays from the latter directed in a confined path adjacent the surface of the dial and in a plane substantially parallel to the dial and then deflected from the path and substantially evenly distributed over the surface of the dial.

Another object is to provide a novel device for use in illuminating an indicating surface such as a dial of an instrument whereby light may be introduced to the dial from a point source and the rays from the latter directed in a confined path adjacent the periphery of the dial and then deflected from the path and substantially evenly distributed from the periphery of the dial toward the center thereof and along its surface.

Another object is to provide a novel illuminating adapter whereby an optical device embodying the invention may be attached to a ready-built instrument mounted on a panel, for indirectly illuminating the dial of the instrument from an external source in the manner set forth above.

A further object is to provide, in combination with a source of light and an indicating dial or other indicating surface, a novel device for illuminating the dial or surface and comprising a transparent light directing member having its outer surface coated with a material which prevents light rays from emerging from the member but reflects them in the interior thereof, said member extending along a path adjacent the periphery of the dial and the coating of material covering the entire surface of said member except for a relatively narrow slit extending along said member on or near that side thereof which is adjacent said dial whereby light emerges from said slit and is directed onto said dial without producing glare and without permitting the light rays to be visible from the front of the dial. Preferably, though not necessarily, the slit is made to diverge along the surface of the member from the point or near the point at the end of said member at which light is introduced thereinto.

A still further object is to provide in an indicating instrument having a dial, novel means for indirectly illuminating the dial of said instrument and constituting an integral part of the assembled instrument, comprising an illuminating member of light conducting material and of substantial length adjacent the plane of the dial, said member having its outer surface coated with a material which prevents light rays from emerging from said member, said coating of material covering substantially the entire surface of said member except for a relatively narrow slit extending along said member on that side thereof which is adjacent the dial whereby light emerges from said slit and onto said dial without producing glare and without permitting the rays to be visible from the front of the dial, and means for passing light through said member from one end thereof.

A further object of the invention is to provide a simple and inexpensive illuminated dial having a pointer or pointers, in which the pointers and/or the scale of the dial are clearly legible both when not illuminated and viewed by daylight, and when illuminated at night in accordance with the novel method of the invention.

Another object is to provide a dial having an indirectly illuminated scale or pointer(s) or both which appear to be in themselves sources of illumination when viewed in the dark.

Still another object of the invention is to provide a novel and simple illuminating adapter whereby the same may be easily attached to a ready-built instrument mounted on a panel by fastening screws and may be secured to the front of the instrument by the same screws which hold the instrument on the panel.

The above and other objects and advantages of the invention will appear more fully hereinafter from a consideration of the detailed description which follows, taken together with the accompanying drawings, wherein several embodiments of the invention are illustrated. It is to be expressly understood, however, that the drawings are for the purposes of illustration and description only and are not intended to define the limits of the invention, reference being had to the appended claims for this purpose.

In the drawings, wherein like reference characters refer to like parts throughout the several views, Fig. 1 is a front view of an indicating instrument having one form of illuminating means embodying the present invention applied thereto as an adapter;

Fig. 2 is an enlarged cross-sectional view taken on line 2—2 of Fig. 1;

Fig. 3 is a sectional view taken on line 3—3 of Fig. 2;

Fig. 4 is an exploded view of the illuminating adapter embodying the invention and removed from the instrument;

Fig. 5 is a sectional view of another embodiment of the invention wherein the illuminating means are embodied in an instrument as an integral part thereof;

Fig. 6 is a section taken on line 6—6 of Fig. 5;

Fig. 7 is an enlarged partial view of parts of another embodiment of the illuminating means of the invention;

Fig. 8 is an enlarged detailed perspective view showing the manner of applying a source of light to the parts shown in Fig. 7;

Fig. 9 is an enlarged partial detail view showing the manner in which light is transmitted from the light source and distributed over the surface of the dial in accordance with the invention;

Fig. 10 is an enlarged detail view showing the cross section of another form of optical member embodying the invention and the manner in which light is distributed over the dial;

Fig. 11 is an enlarged view of a portion of an optical member made in accordance with the invention and showing the manner in which light rays pass therethrough and are reflected therefrom;

Fig. 12 shows a portion of another form of optical member;

Fig. 13 illustrates a portion of still another form of optical member, showing its cross section;

Fig. 14 illustrates a still further form of the optical member, showing its cross section;

Fig. 15 is a cross-sectional view of another embodiment of the invention and forming an integral part of an indicating instrument;

Fig. 16 is a sectional view taken on line 16 of Fig. 15; and

Fig. 17 is a perspective view of a still further embodiment of the invention, wherein the light-conducting member is in the form of a straight glass or quartz rod.

The invention consists substantially in the construction, combination, location and relative arrangements of parts for obtaining the results desired in accordance with the hereinbefore stated objects, as will be more fully hereinafter set forth in the specification, as shown in the drawings and as finally pointed out in the claims.

Heretofore, various methods, means, arrangements and combinations have been utilized in an endeavor to indirectly illuminate an indicating dial such, for example, as the dial of an indicating instrument and, although such prior arrangements were successful in accomplishing their functions to a certain extent, it was difficult to obtain substantially uniform distribution of light over the dial and, hence, the illumination of the dial was not uniform. It was also difficult to secure adequate shielding of the source from which illumination was derived. In accordance with the present invention, these difficulties are substantially eliminated and substantially uniform distribution and illumination of the dial is obtained. This is accomplished by providing a member in the form of a rod of any light conducting material such as glass or quartz having any desired cross section, preferably circular, and curved to conform substantially to the contour of the periphery of the dial or surface to be illuminated. The optical member may be in one piece or in two or more sections placed end to end to provide for ease in assembling. The outer surface of the glass or quartz rod may be coated with a material which prevents light rays from emerging therefrom and which preferably may act as a reflecting surface on the inside of the rod so that when light rays are passed through the rod, they will be reflected by the surface. If the surface is coated, the coating of material is made to cover the entire surface of the rod except for a relatively narrow slit extending along the rod on one side thereof, preferably at or near its inner periphery when the rod is bent or otherwise shaped into a form of some geometrical figure, so that when the rod is placed adjacent a dial to be illuminated, the light rays will emerge from the slit and will be directed onto the dial without producing glare and without permitting the rays to be visible from the front of the dial, it being understood, of course, that the rod is placed adjacent the dial with the slit toward the dial.

The coating of material may preferably be dispensed with and, instead, the surface of the light conducting member may be roughened, notched or otherwise treated to provide a plurality of deflecting or reflecting surfaces projecting inwardly of the member so that as the light rays enter from one end of said member and pass therethrough to the other end, many of them are deflected and/or reflected out of their normal path through the member and substantially at right angles to the path at the point of reflection. The entire surface is not roughened but that portion is left smooth and clear which is to be disposed toward the dial to be illuminated so that the deflected or reflected rays may emerge or be emitted from said light conducting member through said smooth or clear portion. Also, the coating and roughening may be used together, the amount of each depending upon the result desired.

A source of light such as a lamp, for example, is then placed at the end of the rod or between the ends of said rod if the latter is bent or otherwise formed into a circular, rectangular, triangular or other geometrical configuration. with the ends brought together but spaced sufficiently apart to permit the lamp to be inserted between said ends. The light from the lamp will enter the rod at the end or ends and will be transmitted therethrough, due to the inherent properties of the light conducting material, along a path defined by the shape of the rod and will be reflected in the interior thereof by the reflecting surface formed by the coating or indentations on the outer surface of the rod or by the deflecting or reflecting surfaces formed when the surface of the rod is roughened, notched or indented.

The path of the light rays will be restricted by the coating of material on the rod or by the roughened surface but they will emerge from the slit formed on one side of said rod and will then impinge upon the dial. If the rod or curved member is coated, the slit is preferably made to taper in such a manner that it will be narrowest near the ends or end of the rod where the light is introduced and will become wider as the distance from the ends or end increases, this for the reason that the light intensity is greatest at the ends or end of the rod where it is introduced and decreases as the light rays pass through the rod. Thus, equal distribution of the light rays is obtained because where the intensity is greatest, less light is permitted to emerge from the rod because the slit is narrower and where the intensity of light is less, more light is permitted to emerge from the rod because the slit gradually widens. It is readily seen that the parts may be reversed, namely, the roughened surface or coating may be tapered so as to produce equal distribution of the light rays, that part of the surface near the source of light being the narrowest and the part remote from the light being the widest in order to reflect the proper amount of light at the respective locations.

Preferably, when the dial is that of an aircraft indicating instrument, the background of said dial is made dark or black and the scale and pointer or pointers are painted white, preferably with a suitable luminous material such as radium paint. In this manner, the white scale and pointers are clearly visible in the daytime without illumination, and at night they are rendered visible alone by virtue of the fact that they are rendered luminescent by the radium paint and because the dial is black, and by providing the indirect illumination of the present invention, the scale and pointers stand out very clearly and prominently and appear to be in themselves sources of illumination without substantially illuminating the dark background of the dial.

The basically novel combination of the present invention is, therefore, constituted by a dial which is preferably dark or black and having a white luminous scale and pointer or pointers, a glass or quartz member having a length sufficient to transmit light to all points of the dial or other surface on which characters are to be illuminated, said member having its outer surface coated with a material, or otherwise formed or treated, so as to prevent light from emerging therefrom except on that side thereof which is adjacent to or faces the dial or surface so that a tapered clear surface is formed through which the light emerges and is directed toward the dial, and a light source disposed at one end of the rod, or between the ends thereof when bent into a geometrical form with the ends adjacent to each other, whereby light from the source is transmitted through the rod and reflected therefrom by the coated or roughened surface through the uncoated or smooth portion towards the dial. When the light conducting member is to be used for illuminating the dial of an indicating instrument, it may be built into and made an integral part of the instrument or it may be made as a part of an adapter which may be secured to a ready-built instrument without having to take the instrument apart or even without removing the instrument from the panel if already mounted thereon. If the first case, the source of light or lamp would also be made a part of the complete instrument and in the second case, the lamp would be made part of the adapter. In either case, suitable means are provided for energizing the lamp.

Referring now to the drawings, the form of the invention shown in Figs. 1 to 4, inclusive, is embodied in an adapter for securing it to a ready-built instrument to illuminate the dial thereof, the instrument being shown, in the present instance, as an altimeter for use on aircraft. It is to be understood, of course, that the invention may be applied to any instrument having a dial provided with a contrasting scale and pointer or pointers which it is desired to illuminate or simply to any surface having characters which it is desired to illuminate.

The adapter, in the form shown, comprises an annular member 17 provided with fastening lugs 18, by means of which it may be secured to the indicating instrument at the lugs 19 (Fig. 1) of the instrument casing 20 (Fig. 2) by means of screws 21 which hold the instrument to the instrument panel 22. The member 17 conforms to the configuration of the periphery of the face of the instrument and although, in the present instance, it is shown as circular, it may take other geometric forms. If, for example, the instrument face were rectangular or triangular, the member 17 could have a corresponding shape. The annular member 17 is provided with an inturned flange 23 on its inner periphery to form a trough or recess 24. Within this trough or recess 24 is adapted to be placed a light conducting member of glass or quartz for example which, in the present instance, is constituted by two semi-circular portions 25 and 26 so that when said portions are placed in recess 24 they form a substantially closed ring with their upper ends 27 and 28 spaced slightly apart for a purpose which will appear hereinafter, and the lower ends 29 and 30 are made to abut a separating member or lug 31 provided on the annular member 17 at the bottom thereof and within the recess 24.

The portions 25 and 26 of the glass or quartz member may be made as a single piece to constitute a ring as will be apparent from a consideration of other embodiments of the invention to be described hereinafter. In the present embodiment, however, the glass member is made in the two semi-circular portions 25 and 26 for the reason that the adapter is shown applied to an instrument in which a setting knob 32 is provided for setting the instrument for a certain desired condition and, hence, the adapter must be made so as to accommodate the knob.

It is to be understood, therefore, that the terms "light-directing member", "glass or quartz member", "optical member", etc., used in this description and in the claims, are intended to include a member composed of two or more pieces held together, as well as a member constituted by a single piece and is intended to cover any light conducting material.

When the semi-circular portions 25 and 26 are placed in the recess 24, they are held therein by means of a retaining ring 33 which is adapted to be secured to the annular member 17 by means of screws 35 (Fig. 4). A shield 36 is provided at the ends 27 and 28 of the portions 25 and 26 and is held in place by the retaining ring 33 when the latter is secured to the annular member 17. The annular member 17 is provided with a lamp-receiving receptacle 37 into which is adapted to be inserted a lamp socket 38 which is threaded at 39 and which carries a small incandescent lamp 40. When the lamp socket 38 is placed into the receptacle 37 and screwed therein by means of the threads 39, the lamp 40 extends into the recess 24 and between the ends 27 and 28 of the semi-circular glass or quartz members 25 and 26 so that light from the lamp 40 enters said members at said ends.

The outer surfaces of the members 25 and 26 are, in the present embodiment, roughened and then coated with a suitable reflecting and opaque material as shown at 41, but on one side of said members the surfaces are left clear to form light emitting slits 42 and 43 which are preferably tapered as shown so that said slits are narrowest at the ends 27 and 28 where the light enters the members 25 and 26 and are widest at the ends 29 and 30. The slits 42 and 43 are so located with respect to the periphery of the cross sections of the members 25 and 26 that they are not covered by the retaining ring 33, i. e., they are nearer the inner periphery of said members so that when the adapter is secured to the instrument casing 20, the light rays are emitted at all angles of from about 15 to 45 degrees to the plane of the members 25 and 26 instead of right angles thereto.

The receptacle 37 is provided with a plug 44 which is adapted to cooperate with a jack (not shown) for connecting the lamp 40 to a suitable source of electrical energy (not shown) when the adapter is secured to the instrument casing 20, a hole being provided in the panel 22 for permitting said plug 44 to pass therethrough as shown in Fig. 2. Thus, it will be seen that when the adapter is assembled with the glass or quartz members 25 and 26 held in the receptacle 24 of the annular member 17 by the retaining ring 33 and the annular member 17 is secured to the instrument lugs 19 by means of the adapter lugs 18 and screws, and the lamp socket 38 is in the receptacle 37 and electrically connected to a suitable source by means of the plug 44, light from the lamp 40 will enter the glass or quartz members 25 and 26 at their ends 27 and 28 and will be transmitted along a light-restricting path defined by the length, cross-section and shape of said members 25 and 26, and will be reflected in said members by the inner surface of the coating material 41 and will be prevented from emerging from said members except at the tapered slits 42 and 43 from which it will be directed towards the instrument through the cover glass 45 thereof and onto the dial 46 having a scale 46a with which the pointers 47 and 48 (Fig. 1) of the instrument cooperate. As previously pointed out, the dial 46 is preferably dark or black and the scale 46a and pointers 47 and 48 are white, preferably coated with a luminous substance such as radium paint.

The members 25 and 26 are positioned adjacent the periphery of the dial 46 and the light from the slits 42 and 43 is emitted at an angle to the plane of the dial 46. The light is distributed from the periphery of the dial toward its center and, since the slits 42 and 43 are tapered, the light intensity is substantially equal over the entire scale of the dial because less light is emitted through the slit where the intensity is greatest and more light is emitted where the intensity is less, i. e., the intensity is greatest at the ends 27 and 28 of said members 25 and 26 and, therefore, the slits are narrowest at the ends, whereas the intensity is the least at the ends 29 and 30 and, therefore, the slits 42 and 43 are widest at this point. Thus, the amount of light emitted from the members 25 and 26 at any two points of the slits 42 and 43 throughout their lengths is substantially equal for the reason that the amount of light emitted is substantially equal to the product of the emitting area and the intensity. Hence, by tapering the slits, the product of intensity and emitting area remains constant, thereby providing uniformity of illumination.

The surface 41 is preferably a roughened surface which is then silvered, as by painting with silver paint or by silvering in the manner that mirrors are silvered, so that on the inside of the members 25 and 26 a high degree of reflection of light is obtained without permitting the light to emerge from said members except at the slits 42 and 43. The shield 36 is to shield the lamp 40 as shown in Fig. 3 and thereby prevent light from being emitted from the adapter anywhere except at the slits provided for the purpose. The shield also aids to concentrate all the light into the ends 27 and 28 of the members 25 and 26.

Referring now to Figs. 5 and 6, there is shown another embodiment of the invention, wherein the light transmitting and distributing member is in the form of a one-piece ring 49 instead of in two semi-circular pieces, and is built into the instrument as an integral part thereof. In this embodiment, the light conducting ring 49 is placed behind the cover glass 45 of the instrument and is supported by an annular retaining member 50. In assembling the instrument the member 49 is placed into the retaining member 50 and the cover glass 45 is then pressed against the member 49 and secured in place by means of a clamping ring 51 as is well known to those skilled in the instrument art. Thus, the cover glass 45 cooperates with the retaining member 50 to hold the light directing member 49 in place adjacent the periphery of the dial 46 of the instrument.

In this embodiment, the lamp 40 is at right angles to the plane of the cover glass 45 and since the member 49 is in the form of a solid one-piece ring it has no ends between which the lamp 40 can be inserted. Means are, therefore, provided for introducing light into the interior of the ring member 49. For this purpose, a small circular piece 52 is cut out of the cover glass 45 near its periphery, adjacent the point at which the lamp 40 is located, the diameter of said piece 52 being substantially equal to the diameter of the cross section of the ring member 49 and to the diameter of the lamp 40. The circular piece 52 is then cemented back into place in the cover glass 45, by means of an opaque material thus providing a break in the continuity of the cover glass at the point at which light is emitted from the lamp 40. By virtue of this fact and because the cemented surfaces between the circular piece 52 and the cover glass 45 act to prevent light from being dispersed in the cover glass itself, the light rays from lamp 40 are concentrated and directed in a direction at right angles to the plane of the cover glass and towards the glass ring member 49, the latter being slightly cut away at a point opposite the circular piece 52 as shown at 53 in Fig. 6.

Inasmuch as the light from the lamp 40 enters the glass ring member 49 through the portion 53 from the side of the ring and in a direction at right angles to the plane of said ring, means are provided for reflecting the light so that it will be directed into the ring in a direction at right angles to the cross section of the ring at the point at which the light enters the portion 53. To attain this purpose, the ring member 49 is notched as shown in Fig. 6 to form two plane surfaces 54 and 55 which are at right angles to each other and at an angle of about forty-five degrees (45°) to the direction at which the light enters the glass ring member from the lamp 40. These plane surfaces 54 and 55 are then silvered to provide reflecting surfaces on the inside of the ring member 49 so that as the light enters the ring at the portion 53, it is reflected in the directions shown by the arrows in Fig. 6. Since the glass member 49 is in the form of a one-piece ring, the tapered slits 42 and 43 shown in Fig. 4 of the adapter are also joined to form a single slit the narrow ends of which are shown at 42a in Fig. 6.

Thus, in the embodiment shown in Figs. 5 and 6, when the lamp 40 is energized, light is directed toward the glass ring member 49 through the circular piece 52 of the cover glass 45 of the instrument without being dispersed through said cover glass and enters the ring member 49 in a direction at right angles to the plane thereof, but is reflected in opposite directions by reflecting surfaces 54 and 55 of the notched portion of the ring so that the light is distributed through the interior of said ring member, emerges through the tapered slit 42a and is thereby directed against the dial 46 substantially along its periphery toward the center substantially in the same manner as in the embodiment shown in Figs. 1 to 4, inclusive.

In Figs. 7 and 8 is shown another form of structure for introducing light into the glass ring member 49 from a lamp positioned at right angles to and out of the plane of the ring as in Fig. 5. In this form the light conducting ring member 49 is also in the form of a one-piece ring but has a piece cut out to provide ends 56 and 57 adjacent each other. Between these ends 56 and 57 is then placed a light conducting piece 58 which is preferably in the form shown in Fig. 8. The width of the member 58 is substantially equal to the distance between the ends 56 and 57 of the glass ring member 49 so that when said piece 58 is inserted between said ends, the latter fall flush against the sides 59 and 60 of said piece.

The piece 58 is provided with an opening 61 accessible from the front side thereof and into which the lamp 40 is adapted to be inserted when the lamp socket 38 is placed into its receptacle 37. The outer surface of the piece 58, like that of the glass or quartz ring member 49, is coated, roughened, notched or otherwise treated, so as to form a mirrored surface in the inside of said piece 58. On both the sides 59 and 60, however, of the piece 58 and near the lower end thereof some of the surface 41 is scratched away or otherwise removed to provide passages, one of which is shown at 62 in Fig. 8, through which light rays are adapted to emerge and enter the ends 56 and 57 of the ring member 49 when said piece 58 is placed between said ends as shown in Fig. 7. Also, as shown, the lower end of the piece 58 is cut away to form a V-notch to provide reflecting surfaces 63 and 64, respectively. Thus, it will be seen in this embodiment that as light rays from the lamp 40 pass downwardly through the piece 58 they are reflected by the surfaces 63 and 64 in opposite directions at right angles to the directions at which they strike said surfaces 63 and 64 and emerge through the clear surfaces 62 which coincide with the ends 56 and 57, respectively, of the ring member 49, whereby said light rays enter said ring member as indicated by the arrows in Fig. 7. On entering the ends 56 and 57, the light rays are transmitted through the ring member 49 substantially along its entire length and are then reflected out of said ring member through the tapered slit 42a and toward the surface of the dial 46 in the manner previously described and as illustrated in Fig. 9, whereby the scale 46a is equally illuminated throughout the circumference of the dial without producing glare or rendering the light source or any light rays visible from the front of the dial.

In Fig. 10 is shown a cross-section of another form of glass ring member 49 in which is shown in detail how the outer periphery of the ring is made rough, or notched or corrugated, as shown at 63, before the coating of reflecting material 41 is applied thereto, in order to provide better reflection of the light rays on the inside of said ring member and outward through the clear surface or slit 42a. This roughened or corrugated portion 63 may be made continuous on the outer periphery of the ring or it may be provided in the form of circular or oval indentations 64 as shown in Fig. 12.

In the embodiment shown in Fig. 10, however, the coating 41 may be dispensed with inasmuch as the roughened or corrugated portion 63 provides many deflecting or reflecting surfaces which deflect and/or reflect the light rays from their normal path and out of the light conducting member 49 in the manner shown in Fig. 11; but in such case, the corrugations are made substantially completely over the entire periphery of the glass member. A portion extending throughout substantially the length of said member, nearer its inner periphery, and on that side thereof which is to be placed toward the dial to be illuminated, is left uncorrugated so as to provide the necessary light-emitting passage. The area corrugated may be controlled and tapered instead of the slit 42a in order to provide uniform distribution of the light and in the desired amount.

In the embodiment shown in Fig. 12, the surface of the light conducting member 49 is preferably uncoated except at the circular or oval indentations 64, i. e., only the indentations are silvered and provide the necessary reflecting surfaces. If desired, however, even the indentations may be left uncoated inasmuch as they will still be capable of deflecting the light rays from their normally curved path through the member although not to as great an extent as when they are coated.

A further embodiment of the invention may be employed in which the outer periphery of the ring member 49, whether silvered or not, is notched at spaced intervals along its length or circumference as shown at 65 in Fig. 11. In the latter figure the arrows indicate the manner in which light rays are transmitted through the ring and are reflected therefrom by the mirrored surface and/or the notches 65.

In Figs. 13 and 14 are shown still further embodiments of the light conducting ring member 49, in which said member has cross-sections other than circular and in which only certain portions of the surface are coated.

In Fig. 13 the outer surface of the ring 49 is formed in parallel circumferentially extending ridges forming curved surfaces 66 with the concave sides thereof facing the inside of the ring. That side of the ring member 49 which is to be placed toward the dial to be illuminated is preferably flat as shown at 67. The inner periphery of said ring member is also formed in parallel ridges but their surfaces are not curved in the manner as those of the outer ridges. In this form, the entire surface of the ring member 49 is coated with the material 41 except for the plane surfaces 68 so that the latter correspond to the slits 42 and 43 shown in Fig. 4 or the slit 42a shown in Figs. 6, 7 and 9. Thus, the light which enters the glass ring member 49 is reflected by the curved surfaces 66 and is made to emerge from the uncoated or clear surfaces 68 as shown by the arrows in Fig. 13.

In Fig. 14 the cross-section of the ring member 49 is shown triangular, one side of the triangle constituting that side of the ring which is to be disposed toward the dial to be illuminated. Two sides of the triangle are made flat as shown at 69 and 70 while the third side is curved as shown at 71, the latter forming the curved surface of the outer periphery of said ring member 49. The entire surface of the ring member is coated or shielded with the material 41 except the side 69 which is to be disposed adjacent the dial to be illuminated and through which the light rays emerge after reflection by the curved surface 71 as shown by the arrows in Fig. 14.

In Figs. 15 and 16 is shown another embodiment of the invention in which the light-directing and light-reflecting ring member 49 is built into an instrument to form an integral part thereof. In this embodiment, the instrument mechanism is housed in a sub-casing 71 provided in the main casing 20, said sub-casing constituting a support for the dial 46 with which the pointer 47 cooperates. The light conducting ring member 49 is disposed in front of the dial 46 and held in place by means of a retaining ring 72 and the cover glass 45, the latter being held against said ring member by the clamping ring 51 as in Fig. 5. In this embodiment, however, the ends 56 and 57 of the ring member 49 are bent outwardly thereof, as shown in Fig. 16, and are made to project into an auxiliary compartment 20a of the main casing 20, into which the lamp 40 is adapted to project when the lamp socket 38 is inserted into an opening 73 provided in the front of the instrument as shown in Fig. 15. Thus, the ends 56 and 57, instead of being disposed directly opposite each other as is the case in Figs. 3 and 7, are disposed at an angle to each other as shown in Fig. 16 with the lamp 40 disposed in the angular space formed by said ends. In order to completely conceal the illuminating ring member from view when the instrument is viewed from the front, an annular shield 74 is provided which has an outwardly extending flange 75 by means of which said shield is held in place in front of said ring member 49 by the cover glass 45. Otherwise, the ring member functions in the same manner as in the other embodiments hereinbefore described.

In Fig. 17 is shown a still further embodiment of the invention, wherein the member 49 is in the form of a straight glass or quartz rod extending along only the upper edge of the dial or surface 46, the latter being shown as rectangular. In this embodiment the light rays are directed downwardly of the surface from its upper edge and are distributed over said surface, the amount of light emitted being constant since the slit 42a tapers outward from the end adjacent the lamp 40. The other end of said rod may be coated with the material 41 in order to prevent the light rays from being emitted at any other place except from the slit 42a.

The uncoated or clear surfaces or slits 42, 43 or 42a may be formed by leaving the portions uncoated at the time that the material 41 is applied to the ring member or the latter may be completely coated and then the material 41 removed to form the necessary slits.

There are thus provided novel means for indirectly illuminating an indicating dial of an instrument or other indicating device whereby the light is substantially equally distributed to the dial without producing glare and without rendering the light source or any rays therefrom visible from the front of the dial. There is also provided, as a new article of manufacture, a novel optical member for use in illuminating a dial whereby light may be introduced to the dial from a point source and the rays from the latter directed in a confined path adjacent the dial and then reflected from said path out of said optical member and then substantially evenly distributed over the surface of the dial to illuminate the latter together with the pointer if one be provided. There is further provided a novel illuminating adapter which may be attached to a ready-built instrument mounted on a panel for indirectly illuminating the dial of the instrument from an external source.

Although several embodiments of the invention have been illustrated and described by way of example, various changes in the form and relative arrangement of the parts, which will now appear to those skilled in the art, may be made without departing from the scope of the invention.

Reference is, therefore, to be had to the appended claims for a definition of the limits of the invention.

What is claimed is:

1. In an indicating instrument, the combination of a casing provided with a dial having a dark background and a contrasting light-diffusing scale and pointer, a light-conducting and light-emitting member extending substantially along only the periphery of the dial and formed to prevent light emerging therefrom except through a relatively narrow passage provided at that side thereof which is adjacent said dial substantially along the entire length of said member, and means for introducing light into said member from the exterior thereof.

2. In combination, a dial or indicating surface having a dark background and contrasting light-diffusing characters or numerals to be illuminated, an elongated light-conducting and light-emitting optical member having a form corresponding to the contour of said dial and located adjacent the front of said dial and so constructed and arranged as to prevent light emerging therefrom except at that side thereof which is adjacent said dial, and means for introducing light into said member from an external source whereby said light is emitted by said member only in the direction of the dial.

3. In combination, a dial or indicating surface having characters or numerals thereon to be illuminated, an elongated light-conducting and light-emitting member disposed adjacent said dial and defining a confined light-conducting path extending along so much of said dial or surface as is desired to be illuminated, said member being confined to the periphery of said dial and so constructed and arranged as to prevent light emerging therefrom except at that side thereof which is adjacent said dial, and means for introducing light into said member from an external source whereby said light is directed through said member along its length and is emitted by said member from the side thereof in a direction toward the dial.

4. An element for use in illuminating a circular dial, comprising an open-ended annular glass or quartz member having a diameter substantially equal to the diameter of the dial to be illuminated, and having its ends arranged to receive a lamp therebetween for directing light rays into said member, and having its surface treated to render it substantially opaque but arranged to form a light-emitting passage on that side which is to be adjacent the dial, whereby light rays introduced into said member from its ends are conducted therethrough and are prevented from emerging therefrom except through the light-emitting passage, whereby said rays may be directed in a direction toward the dial when the latter is placed adjacent to said member.

5. In combination, a casing provided with a circular dial having a dark background and a contrasting light-diffusing scale, an annular light-conducting and light emitting member extending substantially around the periphery only of said dial and spaced outwardly a suitable distance therefrom and having its surface so treated as to prevent emission of light therefrom but forming a light-emitting passage extending along said member on that side thereof which is adjacent said dial, and means for introducing light rays into said member from an external source whereby said rays are conducted around said dial by said member and are emitted through said passage in a direction towards the dial.

6. In combination, a casing provided with a circular dial having a dark background and a contrasting light-diffusing scale, an annular light-conducting member surrounding said dial and spaced outwardly a suitable distance from said dial and having its surface so treated as to prevent emission of light therefrom but forming a light-emitting passage extending along said member on that side thereof which is adjacent said dial, means for introducing light rays into said member from an external source whereby said rays are conducted around said dial by said member and are emitted through said passage in a direction towards the dial, and an annular shield in front of and concealing said light-conducting member from the front of said casing.

7. Means for illuminating an indicating surface provided with a cover glass, comprising a light source, and light-conducting and transmitting means formed to enclose a space having a desired geometric shape cooperating with said light source, the envelope of said light-conducting means having a treated portion whose cross sectional area gradually changes as said portion extends along said envelope whereby light is emitted throughout the extent of said means uniformly over said surface.

8. A combination as set out in claim 6 but characterized by the fact that the elongated light-conducting member is constructed of optical material and is triangular in cross-section.

9. A combination as set out in claim 6 but characterized by the fact that the elongated light-conducting member is constructed of optical material having a plurality of markings along its surface whereby said light is reflected outwardly from the side of said member.

10. In an indicating instrument including a dial to be illuminated, the combination of a light-conducting and light-emitting member extending substantially along only the periphery of the dial and formed to prevent light emerging therefrom except through a relatively narrow passage provided at that side thereof which is adjacent the dial substantially along the entire length of said member, and means for introducing light into said member from the exterior thereof.

11. In an indicating instrument having an indicating surface to be illuminated, the combination of an elongated light-conducting member formed to enclose a space having a desired geometrical shape, means for introducing light rays into said member from an external source, and means on the periphery of said member for reflecting said light rays outwardly from said member throughout its extent in a direction from its periphery and towards said surface to illuminate the same.

12. In an indicating instrument having an indicating surface to be illuminated, the combinaton of an elongated light-conducting member formed to enclose a space having a desired geometrical shape, means for introducing light rays into said member from an external source, means for emitting said light rays outwardly from said member throughout its extent in a direction from its periphery and towards said surface to illuminate the same, said emitting means being so arranged along said member in a direction extending away from said light source that uniform intensity of illumination is obtained upon said surface.

13. In an indicating instrument having an indicating surface to be illuminated, the combination of an elongated light-conducting member adjacent said surface and formed to enclose a space having a predetermined geometric shape in a plane substantially parallel to or coincident with said surface to provide a confined light-conducting path having said geometric shape whereby light rays introduced into said member from an external source are confined to travel only along said path, a source of light externally of said light-conducting member for introducing light rays into said member whereby they are conducted along said confined path, and means for diverting said light rays out of said confined path at points therealong in directions from said path and towards said surface to illuminate the same.

14. In an indicating instrument having a circular indicating surface to be illuminated, the combination of an annular solid light-conducting member adjacent said surface to provide a confined annular light-conducting path in a plane substantially parallel to or coincident with said indicating surface, means for introducing light rays into said annular light conducting member, and means on said member for reflecting said light rays out of said light-conducting member at points along its periphery in directions from said periphery and towards said surface to illuminate the same.

15. An illumination device comprising an elongated member of light-conducting material formed to provide throughout the entire length of said member a continually direction-changing light-conducting path having a predetermined geometric shape, means for introducing light into said member from the exterior thereof, and means cooperating with said member for reflecting the light out of said member from any chosen side thereof in any desired direction at points extending along substantially the entire length of said member.

GREGORY V. RYLSKY.